United States Patent
Vasseur (10) Patent No.: US 6,536,492 B2
(45) Date of Patent: Mar. 25, 2003

(54) SILICA-CONTAINING RUBBER COMPOSITION VULCANIZABLE WITH SULFUR

(75) Inventor: Didier Vasseur, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/767,044

(22) Filed: Jan. 22, 2001

(65) Prior Publication Data

US 2001/0034389 A1 Oct. 25, 2001

Related U.S. Application Data

(63) Continuation of application No. PCT/EP99/05155, filed on Jul. 20, 1999.

(30) Foreign Application Priority Data

Jul. 22, 1998 (FR) .............................. 98/09393

(51) Int. Cl.$^7$ ................................ B60C 5/00
(52) U.S. Cl. ................ 152/450; 524/571; 524/492; 525/342; 525/343; 552/450; 552/209.1; 564/230; 556/25
(58) Field of Search ................ 524/571, 492; 525/342, 344; 152/450, 209.1; 564/230; 556/25

(56) References Cited

U.S. PATENT DOCUMENTS

| | | | |
|---|---|---|---|
| 3,842,111 A | 10/1974 | Meyer-Simon | 260/448.2 |
| 3,873,489 A | 3/1975 | Thurn et al. | 260/33.6 |
| 3,978,103 A | 8/1976 | Meyer-Simon | 556/428 |
| 3,997,581 A | 12/1976 | Pletka et al. | 556/408 |
| 4,002,594 A | 1/1977 | Fetterman | 524/83 |
| 4,343,339 A * | 8/1982 | Schwindt et al. | |
| 5,569,721 A | 10/1996 | Scholl et al. | 525/332.7 |
| 5,580,919 A | 12/1996 | Agostini et al. | 524/430 |
| 5,583,245 A | 12/1996 | Parker et al. | 556/427 |
| 5,652,310 A | 7/1997 | Hsu et al. | 525/331.9 |
| 5,663,396 A | 9/1997 | Musleve et al. | 556/427 |
| 5,684,171 A | 11/1997 | Wideman et al. | 556/427 |
| 5,684,172 A | 11/1997 | Wideman et al. | 556/427 |
| 5,696,197 A | 12/1997 | Smith et al. | 524/495 |
| 5,716,913 A | 2/1998 | Yamamoto et al. | 508/365 |
| 5,939,493 A | 8/1999 | Hojo | 525/332.6 |

FOREIGN PATENT DOCUMENTS

| | | |
|---|---|---|
| CA | 2153509 | 1/1996 |
| DE | 4435311 | 4/1996 |
| EP | 0015824 | 9/1981 |
| EP | 0332920 | 9/1989 |
| EP | 0501227 | 7/1993 |
| EP | 0683203 | 5/1995 |
| EP | 0692518 | 1/1996 |
| EP | 0769545 | 4/1997 |
| EP | 0832920 | 6/1998 |
| EP | 0864604 | 9/1998 |
| EP | 0810258 | 5/1999 |
| FR | 1556085 | 11/1969 |
| FR | 2094859 | 3/1973 |
| FR | 2206330 | 6/1976 |
| GB | 1066576 | 4/1967 |
| JP | 10151906 | 6/1998 |
| WO | 9637581 | 11/1996 |

OTHER PUBLICATIONS

Penot, 09/724,038 filed on Nov. 28, 2000.*
Daniel et al., 09/462,387 filed on Apr. 19, 2000.*
Chem. Abstr. vol. 89 No. 26, Abstr, No. 216568.
Chem. Abstr. vol. 114, No. 6 Abstr. No. 44671 (Feb. 11, 1991).

* cited by examiner

Primary Examiner—Robert Dawson
Assistant Examiner—Kao-Liang Peng
(74) Attorney, Agent, or Firm—Baker Botts L.L.P.

(57) ABSTRACT

The present invention provides for a coupling system (white filler/diene elastomer) for a rubber composition based on diene elastomer reinforced with a white filler, formed by the association of a polysulphurized alkoxysilane, a zinc dithiophosphate and a guanidine derivative. The invention also provides a rubber composition usable for the manufacture of tires, comprising, as base constituents, one or more diene elastomer(s), a reinforcing white filler, a polysulphurized alkoxysilane coupling agent with which are associated a zinc dithiophosphate and a guanidine derivative. Also provided is a process for preparing such a rubber composition, and a tire or semi-finished product, in particular a tread for a tire, comprising a rubber composition according to the invention.

46 Claims, 1 Drawing Sheet

SILICA-CONTAINING RUBBER COMPOSITION VULCANIZABLE WITH SULFUR

BACKGROUND OF THE INVENTION

This is a continuation of PCT application No. PCT/EP99/05155 filed Jul. 20, 1999, now WO 00/05301.

The present invention relates to diene rubber compositions reinforced with a white filler, which are intended, in particular, for the manufacture of tires or semi-finished products for tires, in particular, treads for these tires.

Since fuel economies and the need to protect the environment have become priorities, it has become desirable to produce elastomers with good mechanical properties and as low a hysteresis as possible so that they can be used in the form of rubber compositions for the manufacture of various semi-finished products involved in the constitution of tires, including inter alia, underlayers, calendering or sidewall rubbers, or treads, and to obtain tires with improved properties, in particular, reduced rolling resistance.

To achieve such an objective, numerous solutions have been proposed, such as those essentially concentrating on the use of elastomers modified by means of agents, such as coupling, starring or functionalizing agents, with carbon black as the reinforcing filler, with the aim of obtaining a good interaction between the modified elastomer and the carbon black. It is generally known that, in order to obtain the optimum reinforcement properties imparted by a filler, the filler should be present in the elastomeric matrix in a final form which is both as finely divided as possible and distributed as homogenously as possible. Currently, such conditions may only be obtained insofar as the filler has a very good ability, first, to be incorporated into the matrix during mixing with the elastomer and to disagglomerate and, second, to be dispersed homogenously in this matrix.

It is well known that while carbon black has such abilities, it is generally not true of white fillers. For reasons of mutual attraction, white filler particles have an irritating tendency to agglomerate together within the elastomeric matrix. These interactions have the harmful consequence of limiting the dispersion of the filler and hence its reinforcing properties to a level substantially lower than which it would be theoretically possible to achieve if all the (white filler/elastomer) bonds that could be created during the mixing operation were in fact obtained. These interactions further tend to increase the consistency of the rubber compositions and, therefore, to make them more difficult to work ("processability") in the uncured state than if carbon black were used as filler.

However, interest in rubber compositions reinforced with white filler was greatly revived with the publication of European Patent Application EP-A-0 501 227, which discloses a sulphur-vulcanizable diene rubber composition, reinforced with a special precipitated silica of the highly dispersible type, which makes it possible to manufacture a tire or tread with substantially improved rolling resistance, without adversely affecting the other properties, in particular those of grip, endurance and wear resistance. Application EP-A-0 810 258 discloses a novel diene rubber composition reinforced with another special white filler, i.e., a specific alumina ($Al_2O_3$) of high dispersibility, which also makes it possible to obtain tires or treads having an excellent compromise of contradictory properties.

Although the use of these specific, highly dispersible silicas or aluminas as reinforcing fillers, whether or not as the major component, has reduced the difficulty of processing the rubber compositions that contain them, such compositions are still more difficult to process than rubber compositions filled conventionally with carbon black.

In particular, it is necessary to use a coupling agent, also known as a bonding agent, the function of which is to provide the connection between the surface of the white filler particles and the elastomer, while also facilitating the dispersion of this white filler within the elastomeric matrix.

The term "coupling agent" (white filler/elastomer) is understood by those skilled in the art to mean an agent capable of establishing a sufficient chemical and/or physical connection between the white filler and the elastomer. Such a coupling agent, which is at least bifunctional, has, for example, the simplified general formula "Y—T—X", in which:

Y represents a functional group ("Y" function) which is capable of bonding physically and/or chemically with the white filler, such a bond being able to be established, for example, between a silicon atom of the coupling agent and the hydroxyl (OH) surface groups of the white filler (for example, surface silanols in the case of silica);

X represents a functional group ("X" function) which is capable of bonding physically and/or chemically with the elastomer, for example by means of a sulphur atom;

T represents a hydrocarbon group that links Y and X.

Such coupling agents are not to be confused with simple agents for covering the white filler which, in known manner, may comprise the above-cited Y function which is active with respect to the white filler but are devoid of the X function which is active with respect to the elastomer.

Silica/elastomer coupling agents, in particular, have been described in a large number of documents, the best known being bifunctional alkoxysilanes.

In patent application FR-A-2 094 859 it was proposed to use a mercaptosilane for the manufacture of tire treads. It was quickly shown, and is today well known, that the mercaptosilanes, particularly γ-mercaptopropyltrimethoxysilane or γ-mercaptopropyltriethoxysilane, are capable of giving excellent silica/elastomer coupling properties, but that these coupling agents cannot be used industrially because of the high reactivity of their -SH functions. Such high reactivity very rapidly results in premature vulcanization during the preparation of the rubber composition in an internal mixer, known as "scorching", which results in very high Mooney plasticity values and, ultimately, results in rubber compositions which are virtually impossible to work and process industrially. FR-A-2 206 330 and U.S. Pat. No. 4,002,594 illustrate the impossibility of industrially using such coupling agents bearing -SH functions and the rubber compositions that contain them.

To overcome this drawback, it has been proposed to replace these mercaptosilanes by polysulphurized alkoxysilanes, in particular bis-trialkoxy($C_1$–$C_4$)silylpropyl polysulphides, such as described in numerous patents or patent applications (see for example FR-A-2 206 330, U.S. Pat. Nos. 3,842,111, 3,873,489, 3,978,103 or 3,997,581). Preferred polysulphides, include bis-3-triethoxysilylpropyl disulphide ("TESPD"), more particularly, bis-3-triethoxysilylpropyl tetrasulphide ("TESPT"), the latter being currently regarded as the product which, for vulcanized rubber compositions filled with silica, gives the best compromise in terms of resistance to scorching, processability and reinforcing power.

During the course of research, the Inventor discovered that the use of a zinc dithiophosphate in a small quantity, in combination with a guanidine derivative, had the unexpected effect of activating the coupling function of the polysulphurized alkoxysilanes, resulting in increased effectiveness of the latter.

Due to this activation, it is possible in to substantially reduce the quantity of polysulphurized alkoxysilanes which are usually used in rubber compositions. This is particularly advantageous because these alkoxysilanes are very expensive and also have to be used in a large quantity, generally in the order of two to three times more than the quantity of γ-mercaptopropyltrialkoxysilanes necessary to obtain levels of equivalent coupling properties. See, e.g., U.S. Pat. Nos. 5,652,310, 5,684,171 and 5,684,172. Thus, the present invention can significantly reduce the overall cost of the rubber compositions, as well as that of the tires and/or tire components containing them.

SUMMARY OF THE INVENTION

The present invention relates to a rubber composition usable for the manufacture of tires, comprising as base constituents one or more diene elastomer(s), a reinforcing white filler, a polysulphurized alkoxysilane as coupling agent (white filler/diene elastomer), with which are associated a zinc dithiophosphate and a guanidine derivative.

Another subject of the invention is the use of a rubber composition according to the invention for the manufacture of rubber articles, in particular tires or semi-finished products intended for such tires, these semi-finished products being selected from the group consisting of treads, underlayers intended, for example, to be positioned beneath these treads, crown plies, sidewalls, carcass plies, beads, protectors, inner tubes and airtight internal rubbers for tubeless tires. The invention relates more particularly to the use of such a rubber composition for the manufacture of the sidewalls or treads, owing to its good hysteretic properties.

The invention also relates to a process for the preparation of a rubber composition according to the invention, this process being characterized in that there are incorporated by kneading into one or more diene elastomer(s), a white filler as reinforcing filler, a polysulphurized alkoxysilane coupling agent (white filler/diene elastomer), a zinc dithiophosphate and a guanidine derivative. The invention also encompasses the rubber composition prepared by this process.

The composition according to the invention is particularly suitable for the manufacture of treads for tires intended to be fitted on passenger vehicles, 4×4 vehicles, vans, two-wheelers and heavy vehicles, aircraft, or construction, agricultural or handling machinery, these treads being able to be used in the manufacture of new tires or for recapping worn tires.

The subject of the invention is also these tires and these semi-finished rubber products themselves, in particular the treads, comprising a rubber composition according to the invention.

The invention also relates, per se, to a coupling system (white filler/diene elastomer) for a diene rubber composition reinforced with a white filler, usable for the manufacture of tires, said system being formed by the association of a polysulphurized alkoxysilane, a zinc dithiophosphate and a guanidine derivative.

The subject of the invention is also the use of such a coupling system (white filler/diene elastomer) in a rubber composition for a tire.

The invention is further directed to of a zinc dithiophosphate and a guanidine derivative in combination, in rubber compositions reinforced by a white filler usable for manufacturing tires, for activating the coupling function (white filler/diene elastomer) of the polysulphurized alkoxysilane.

Figure 1:
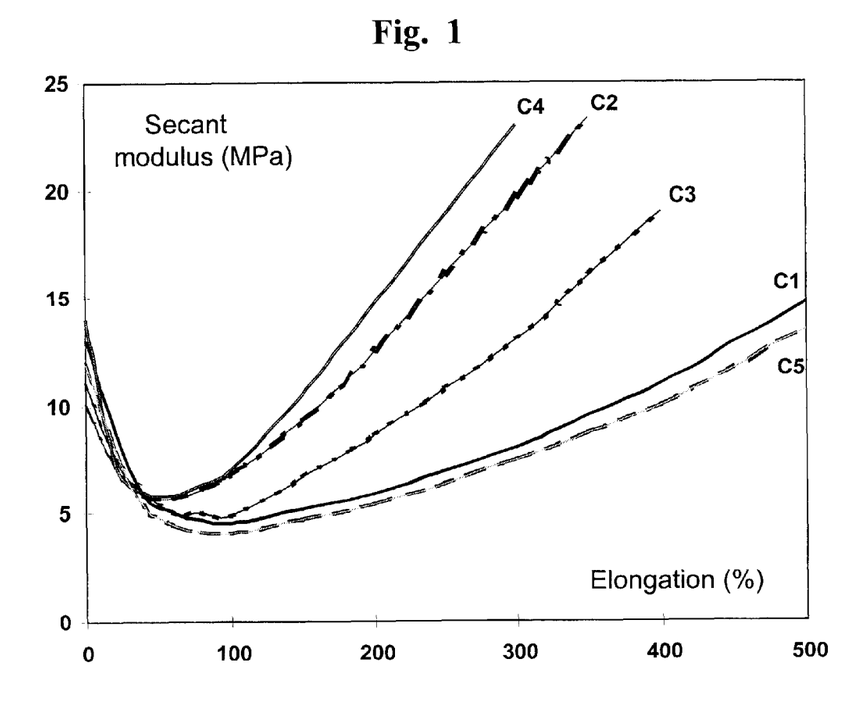
FIG. 1 is a graph showing the curves ($C_1$ to $C_5$ of variation, of the modulus (in MPa) as a function of elongation (in %) for the diene rubber compositions of Test 1.
Figure 2:
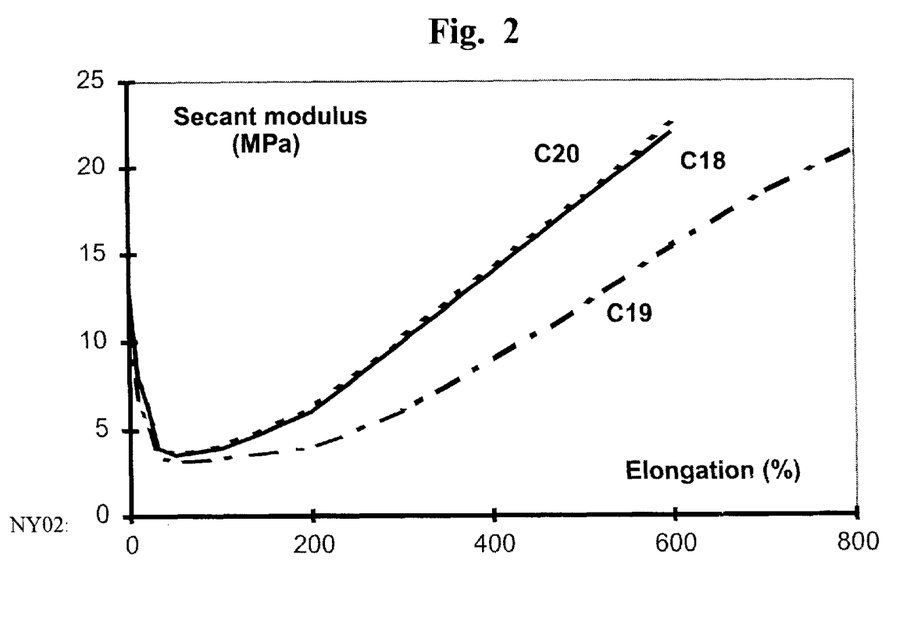
FIG. 2 is a graph showing the curves of variation ($C_1$–$C_{20}$) of the modulus as a function of elongation for the diene rubber compositions of Test 6.

The invention and its advantages will be readily understood in the light of the description and examples of embodiment which follow, and of the figures relating to these examples, which show curves of the variation of modulus as a function of elongation for different diene rubber compositions, whether or not in accordance with the invention.

DETAILED DESCRIPTION OF PREFERRED EMBODIMENTS

I. Measurements and Tests Used

The rubber compositions are characterized before and after curing, as follows.

I-1. Mooney Plasticity

An oscillating consistometer such as described in standard AFNOR-NFT-43005 (November 1980) is used. The Mooney plasticity is measured in accordance with the following principle: the raw composition (i.e., before curing) is molded in a cylindrical enclosure heated to 100° C. After one minute's preheating, the rotor turns within the test sample at 2 rpm, and the torque used for maintaining this movement is measured after four minutes' rotation. The Mooney plasticity (ML 1+4) is expressed in "Mooney units" (MU, with 1 MU=0.83 Newton.meter).

I-2. Tensile Tests

These tests make it possible to determine the elasticity stresses and the properties at break. Unless indicated otherwise, they are effected in accordance with standard AFNOR-NFT-46002 of September 1988. The nominal secant moduli (in MPa) at 10% elongation (M10), 100% elongation (M100) and 300% elongation (M300) are measured in a second elongation (i.e., after an accommodation cycle). The breaking stresses (in MPa) and the elongations at break (in %) are also measured. All these tensile measurements are carried out under normal conditions of temperature and humidity in accordance with standard AFNOR-NFT-40101 (December 1979).

Processing the tensile data recorded also makes it possible to trace the curve of the modulus as a function of the elongation (see attached FIGS. 1–2), the modulus used here being the true secant modulus measured in a first elongation, calculated reduced to the real cross-section of the test piece, and not to the initial section as previously for the nominal moduli.

I-3. Hysteresis Losses

The hysteresis losses (HL) are measured by rebound at 60° C. at the sixth impact, and are expressed in % in accordance with the following equation ($W_0$: energy supplied; $W_1$: energy restored):

$$HL\ (\%)=100[(W_0-W_1)/W_0]$$

I-4. "Bound Rubber" Test

The so-called 'bound rubber' test makes it possible in non-vulcanized compositions, to determine, the proportion of elastomer which is intimately associated with the reinforcing filler such that this proportion of elastomer is insoluble in the usual organic solvents. Determining this insoluble proportion of rubber, fixed by the reinforcing filler during mixing, provides a quantitative indication of the reinforcing activity of the filler in the rubber composition. Such a method has been described, for example, in standard NFT-45114 (June 1989) regarding determining the amount of elastomer bound to the carbon black.

This test, which is well-known to those skilled in the art for characterizing the quality of reinforcement provided by the reinforcing filler, has been described, inter alia, in the following: *Plastics, Rubber and Composites Processing and Applications*, Vol. 25, No. 7, p. 327 (1996): *Rubber Chemistry and Technology*, Vol. 69, p. 325 (1996); incorporated herein by reference.

In the present invention, the amount of elastomer which cannot be extracted with toluene is measured, after swelling a sample of rubber composition (typically 300–350 mg) in toluene (e.g., 80–100 cm$^3$ of toluene) for 15 days, followed by drying at 100° C. under a vacuum for 24 hours, before weighing the sample of rubber composition thus treated. Preferably, swelling is carried out at ambient temperature (approximately 20° C.) and protected from light. The solvent (toluene) is changed once, for example after swelling for five days. The amount of "bound rubber" (% by weight)—abbreviated to "$T_{BR}$"—is calculated from the difference between the initial weight and the final weight of the sample of rubber composition, after making allowance for and eliminating, in the calculation, the fraction of the components other than the elastomer which are insoluble by nature, which are initially present in the rubber composition.

II. Conditions of Carrying out the Invention

In addition to the usual additives or those capable of being used in a sulphur-vulcanizable diene rubber composition which is intended particularly for the manufacture of tires, the rubber compositions according to the invention comprise, as base constituents, (i) at least one diene elastomer, (ii) at least a white filler as reinforcing filler, (iii) at least one polysulphurized alkoxysilane as coupling agent (white filler/diene elastomer) with which are associated, in order to activate the coupling, (iv) at least one zinc dithiophosphate and (v) at least one guanidine derivative.

The coupling system according to the invention itself comprises a polysulphurized alkoxysilane coupling agent, preferably in a majority (i.e. more than 50% by weight), and a coupling activator formed by the association of a zinc dithiophosphate and a guanidine derivative.

I-1. Diene Elastomer

"Diene" elastomer or rubber is understood herein to mean, an elastomer resulting at least in part (i.e. a homopolymer or a copolymer) from diene monomers (monomers bearing two double carbon—carbon bonds, whether conjugated or not).

Generally, "essentially unsaturated" diene elastomer is understood herein to mean a diene elastomer resulting at least in part from conjugated diene monomers, having a content of members or units of diene origin (conjugated dienes) which is greater than 15% (mole %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean a diene elastomer having a content of units of diene origin (conjugated dienes) which is greater than 50%.

These definitions being given, the following are understood to be meant by diene elastomer capable of being used in the compositions according to the invention:

(a) any homopolymer obtained by polymerization of a conjugated diene monomer having 4 to 12 carbon atoms;

(b) any copolymer obtained by copolymerization of one or more dienes conjugated together or with one or more vinyl aromatic compounds having 8 to 20 carbon atoms;

(c) a ternary copolymer obtained by copolymerization of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d) a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes include, 1,3-butadiene, 2-methyl-1,3-butadiene, 2,3-di(C1 to C5 alkyl)-1,3-butadienes such as, 2,3-dimethyl-1,3-butadiene, 2,3-diethyl-1,3-butadiene, 2-methyl-3-ethyl-1,3-butadiene, and 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may be for example, block, statistical, sequenced or microsequenced elastomers, and may be prepared in dispersion or in solution. They may be coupled and/or starred or alternatively functionalized with a coupling and/or starring or functionalizing agent.

Preferred polymers include polybutadienes, in particular those having a content of 1,2-units of between 4% and 80%, or those having a content of cis-1,4 [bonds] of more than 80%, polyisoprenes, butadiene-styrene copolymers, in particular those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers, in particular those having an isoprene content of between 5% and 90% by weight and a glass transition temperature (Tg) of between −40° C. and −80° C., and isoprene-styrene copolymers, in particular those having a styrene content of between 5% and 50% by weight and a Tg of between −25° C. and −50° C.

Suitable butadiene-styrene-isoprene copolymers include those having a styrene content of between 5% and 50% by weight, more particularly, between 10% and 40%, an isoprene content of between 15% and 60% by weight, more particularly between 20% and 50%, a butadiene content of between 5% and 50% by weight, more particularly between 20% and 40%, a content of 1,2-units of the butadiene part of between 4% and 85%, a content of trans-1,4 units of the butadiene part of between 6% and 80%, a content of 1,2-plus 3,4-units of the isoprene part of between 5% and 70%, and a content of trans-1,4 units of the isoprene part of between 10% and 50%, and more generally any butadiene-styrene-isoprene copolymer having a Tg of between –20° C. and –70° C.

Preferably, the diene elastomer of the composition according to the invention is selected from among highly unsaturated diene elastomers which include polybutadienes (BR), polyisoprenes (IR) or natural rubber (NR), butadiene-styrene copolymers (SBR), butadiene-isoprene copolymers (BIR), isoprene-styrene copolymers (SIR), butadiene-styrene-isoprene copolymers (SBIR), or a mixture of two or more of these compounds.

The composition according to the invention is preferably intended for a tread for a tire. In such a case, the diene elastomer is preferably a butadiene-styrene copolymer, optionally used in a mixture with a polybutadiene. More preferably, the diene elastomer is an SBR prepared in solution having a styrene content of between 20% and 30% by weight, a content of vinyl bonds of the butadiene part of between 15% and 65%, a content of trans-1,4 bonds of between 15% and 75%, and a Tg of between –20° C. and –55° C. The SBR copolymer may also be used in a mixture with a polybutadiene having preferably more than 90% cis-1,4 bonds.

The compositions of the invention may contain a single diene elastomer or a mixture of several diene elastomers. The diene elastomer or elastomers optionally may be used in association with any type of synthetic elastomer other than a diene elastomer, or even with polymers other than elastomers, for example thermoplastic polymers.

I-2. Reinforcing Filler

The white filler used as reinforcing filler may constitute all or only part of the total reinforcing filler, in the latter case associated, for example, with carbon black.

Preferably, in the rubber compositions according to the invention, the reinforcing white filler constitutes the majority, i.e. more than 50% by weight, of the total reinforcing filler, more preferably more than 80% by weight of this total reinforcing filler.

In the present application, "reinforcing" white filler is understood to mean a white filler (sometimes also referred to as "clear filler") which is capable, on its own, without any other means than an intermediate coupling agent, of reinforcing a rubber composition intended for the manufacture of tires. In other words the reinforcing white (or clear) filler is capable of replacing a conventional filler of carbon black in its reinforcement function.

Preferably, the reinforcing white filler is a mineral filler, in particular silica ($SiO_2$) alumina ($Al_2O_3$) or a mixture of silica and aluminas. The silica used may be any reinforcing silica known to those skilled in the art, in particular any precipitated or pyrogenic silica having a BET surface area and a specific CTAB surface area both of which are less than 450 m²/g. The highly dispersible precipitated silicas are preferred, in particular when the invention is used to manufacture tires having a low rolling resistance. "Highly dispersible silica" is understood to mean any silica having a very substantial ability to disagglomerate and to disperse in an elastomeric matrix, which can be observed in known manner by electron or optical microscopy on thin sections.

Non-limiting examples of such preferred highly dispersible silicas include the silica Perkasil KS 430 from Alkzo, the silicas BV3380 and Ultrasil 7000 from Degussa, the silicas Zeosil 1165 MP and 1115 MP from Rhodia, the silica Hi-Sil 2000 from PPG, the silicas Zeopol 8715, 8741 or 8745 from Huber, and treated precipitated silicas such as, for example, the aluminium-"doped" silicas described in application EP-A-0 735 088. The reinforcing alumina is preferably a highly dispersible alumina such as described in application EP-A-0 810 258, for example aluminas A125 or CR125 (from Baïkowski), APA-100RDX (from Condea), Aluminoxid C (from Degussa) or AKP-G015 (Sumitomo Chemicals).

The physical state in which the reinforcing white filler is present is immaterial, whether it be in the form of a powder, microbeads, granules or alternatively balls. Of course, "reinforcing white filler" is also understood to mean mixtures of different reinforcing white fillers, in particular of highly dispersible silicas such as described above.

The reinforcing white filler may also be used in a blend (mixture) with carbon black. Suitable carbon blacks are all the carbon blacks, in particular the blacks of the type HAF, ISAF and SAF, which are conventionally used in tires, and particularly in treads for tires. Non-limitative examples of such blacks include the blacks N115, N134, N234, N339, N347 and N375. The amount of carbon black in the total reinforcing filler may vary within wide limits, with the amount preferably being less than the total amount of reinforcing white filler present in the rubber composition.

Preferably, the amount of total reinforcing filler (reinforcing white filler plus carbon black if applicable) lies in a range from 20 to 300 phr, more preferably from 30 to 150 phr, even more preferably from 50 to 130 phr (parts by weight to one hundred parts of elastomer), the optimum differing according to the nature of the reinforcing white filler used and the intended applications. For example, the level of reinforcement expected of a bicycle tire is known to be distinctly lower than that required for a tire capable of travelling at a sustained high speed, for example a motorcycle tire, a passenger-vehicle tire or a tire for a utility vehicle such as a heavy vehicle.

I-3. Coupling Agent

The coupling agent used in the rubber compositions according to the invention is a polysulphurized alkoxysilane, which bears two types of functions referred to here as "Y" and "X", which can be grafted first onto the white filler by means of the "Y" function (alkoxysilyl function) and secondon to the elastomer by means of the "X" function (sulphur function).

Polysulphurized alkoxysilanes are well-known as coupling agents (white filler/diene elastomer) in rubber compositions intended for the manufacture of tires. See, in particular, U.S. Pat. Nos. 3,842,111; 3,873,489; 3,978,103; 3,997,581; 5,580,919; 5,583,245; 5,663,396; 5,684,171; 5,684,172; and 5,696,197, which describe such known compounds in detail.

Particularly suitable coupling agents for implementing the invention, without the definition below being limiting, are so-called "symmetrical" polysulphurized alkoxysilanes which satisfy the following general formula (I):

Z—A—S$_n$—A—Z,  (I)

in which:

n is an integer from 2 to 8;

A is a divalent hydrocarbon radical;
Z corresponds to one of the formulae below:

in which:
  $R^1$, which may or may not be substituted, and may be identical or different, represents a $C_1$–$C_{18}$ alkyl group, a $C_5$–$C_{18}$ cycloalkyl group, or a $C_6$–$C_{18}$ aryl group; and
  $R^2$, which may or may not be substituted, and may be identical or different, represents a $C_1$–$C_{18}$ alkoxyl group or a $C_5$–$C_{18}$ cycloalkoxyl group.

In formula (I) above, the number n is preferably a whole number from 2 to 5, more preferably from 3 to 5.

In the case of a mixture of polysulphurized alkoxysilanes in accordance with Formula (I) above, in particular conventional, commercially available, mixtures, the average value of the "n"s is a fractional number, preferably between 3 and 5, more preferably close to 4. However, the invention may also be implemented advantageously for example with disulphurized alkoxysilanes (n=2).

In formula (I), A, whether substituted or not, is preferably a divalent, saturated or non-saturated hydrocarbon radical, comprising 1 to 18 carbon atoms. In particular $C_1$–$C_{18}$ alkylene groups or $C_6$–$C_{12}$ arylene groups, more particularly $C_1$–$C_{10}$ alkylenes, notably $C_2$–$C_4$ alkylenes, in particular propylene, are suitable.

$R^1$ is preferably a $C_1$–$C_6$ alkyl, a cyclohexyl or a phenyl group, in particular a $C_1$–$C_4$ alkyl group, more particularly methyl and/or ethyl.

$R^2$ is preferably a $C_1$–$C_8$ alkoxyl group or a $C_5$–$C_8$ cycloalkoxyl group, more particularly methoxyl and/or ethoxyl.

Such so-called "symmetrical" polysulphurized alkoxysilanes, and some of the processes for obtaining them are described, for example, in U.S. Pat. Nos. 5,684,171 and 5,684,172, which give a detailed list of these known compounds, for n varying from 2 to 8.

Preferably, the polysulphurized alkoxysilane used in the invention is a polysulphide, in particular a disulphide or a tetrasulphide, of bis(alkoxy($C_1$–$C_4$)silylpropyl), more preferably of bis(trialkoxy($C_1$–$C_4$)silylpropyl), in particular of bis(3-triethoxysilylpropyl) or of bis(3-trimethoxysilylpropyl). By way of example, bis (triethoxysilylpropyl) disulphide, or TESPD, having the formula $[(C_2H_5O)_3Si(CH_2)_3S]_2$, is sold, for example, by Degussa under the names Si266 or Si75 (in the latter case, in the form of a mixture of disulphide (75% by weight) and of polysulphide), or alternatively by Witco under the name Silquest Al 589. Bis(triethoxysilylpropyl) tetrasulphide, or TESPT, having the formula $[(C_2H_5O)_3Si(CH_2)_3S]_2$, is sold, for example by Degussa under the name Si69 (or X50S when it is supported to 50% by weight on carbon black), or alternatively by Witco under the name Silquest A1289 (in both cases, a commercial mixture of polysulphides having an average value of n which is close to 4).

Most preferably, TESPT is used. However, one advantageous embodiment of the invention uses TESPD which, although less active than TESPT when it is used on its own, has an effectiveness which is substantially improved by the presence of the zinc dithiophosphate and the guanidine derivative.

In the rubber compositions according to the invention, the content of polysulphurized alkoxysilane may be within a range of 0.5 to 15% relative to the weight of reinforcing white filler, but it is generally desirable to use as little thereof as possible. The presence of zinc dithiophosphate and guanidine derivative, in these compositions, advantageously make it possible to be able to use the polysulphurized alkoxysilane in a preferred amount of less than 8%, more preferably less than 6%, relative to the weight of reinforcing white filler. Amounts of between 3% and 6% are, for example, possible.

The polysulphurized alkoxysilane may be first grafted (via the "X" function) onto the diene elastomer of the composition of the invention, wherein the elastomer thus functionalized or "precoupled" comprises the free "Y" function for the reinforcing white filler. The polysulphurized alkoxysilane could also be grafted beforehand (via the "Y" function) onto the reinforcing white filler, the thus "precoupled" filler then being able to be bonded to the diene elastomer by means of the free "X" function of the coupling agent.

However, it is preferred to use the coupling agent either grafted onto the reinforcing white filler or in the free (i.e. non-grafted) state, in particular for reasons of better working of the compositions in the uncured state, like the zinc dithiophosphate and the guanidine derivative which are associated therewith in the coupling system according to the invention.

II-4. Activation of the Coupling

The coupling system according to the invention comprises the polysulphurized alkoxysilane coupling agent previously defined above and a coupling activator for this alkoxysilane. Coupling "activator" is understood here to mean a body (a compound or an association of compounds) which, when mixed with the coupling agent, increases the effectiveness of the latter.

The coupling activator used according to the invention is formed by the association of a zinc dithiophosphate and a guanidine derivative.

A) Zinc Dithiophosphate

Zinc dithiophosphate ("DTPZn") is a well-known compound corresponding to the following formula (II):

$(R^3O)_2(S)P$—$S$—$Zn$—$S$—$P(S)(OR^3)_2$, or, in the developed form:

(II)

in which the radicals $R^3$, which may be identical or different, represents hydrogen or a monovalent hydrocarbon group.

Preferably, this monovalent hydrocarbon group comprises from 1 to 18 carbon atoms. More preferably, $R^3$ is a straight-chain or branched, substituted or non-substituted alkyl or cycloalkyl group, comprising from 1 to 12 carbon atoms, in particular a $C_2$–$C_8$ alkyl group or a $C_5$–$C_{12}$ cycloalkyl group. Preferred alkyls are ethyl, propyl, isopropyl, butyl, isobutyl and cyclohexyl, more particularly $C_3$–$C_4$ alkyls.

DTPZn has been used primarily as a lubrication additive in the field of metallurgy (see for example GB-A-1 066 576, EP-A-15 824, EP-A-769 545, U.S. Pat. No. 5,716,913, and WO96/37581), or as a vulcanization ultra-accelerator in essentially saturated rubber compositions of the EPDM type intended, for example, for conveyor belts, tubes or curing membranes (see, e.g., FR-A-1 556 085, EP-A-692 518 and CA-A-2 153 509). DTPZn has been used rarely, in diene rubber compositions for tires (see, e.g., *Chemical Abstracts* vol. 89, No. 26, abstract No. 216568(25/12/78); *Chemical Abstracts* vol. 114, No. 6, abstract No. 44671 (11/02/91); application JP1998/151906; EP-A-0 832 920).

It has been surprisingly discovered that a small quantity of a zinc dithiophosphate, combined with a guanidine derivative, in the rubber compositions of the invention reinforced with a white filler, has a very advantageous function as a coupling activator with respect to polysulphurized alkoxysilanes. This result was quite unexpected to those skilled in the art, since the known ultra-accelerator properties of DTPZn indicated that it would be incompatible with the essentially unsaturated diene elastomers used in rubber compositions intended for the manufacture of tires, in particular regarding the scorching problems described above.

Preferred examples of DTPZn, include the zinc dialkyldithiophosphates sold by Rhein-Chemie (Germany) under the names Rhenocure TP/G and TP/S (mixtures of di-isopropyl- and di-isobutyl-dithiophosphates), the product sold by Monsanto under the name Vocol S (dibutyldithiophosphate), and those described in patent applications EP-A-692 518 or CA-A-2 153 509 referred to above.

Those skilled in the art can readily adjust the optimum content of DTPZn according to the intended application, the diene elastomer selected, the amounts of reinforcing white filler, polysulphurized alkoxysilane and guanidine derivative used, within a range of preferably between 0.25 and 3 phr, more preferably between 0.5 and 1.5 phr, with amounts between 0.5 and 1 phr being particularly advantageous.

The optimum content of DTPZn used is primarily selected as a function of the amount of polysulphurized alkoxysilane used. Preferably, in the coupling system according to the invention, the amount of DTPZn represents between 5% and 60% relative to the weight of polysulphurized alkoxysilane. Below 5%, the effect risks being inadequate, whereas beyond 60% generally no further improvement in the coupling is observed, while the costs of the composition as will as the risk of scorching increase. For these various reasons, the amount of zinc dithiophosphate more preferably represents between 10% and 40% relative to the weight of polysulphurized alkoxysilane.

Moreover, in the rubber compositions according to the invention, the total quantity of polysulphurized alkoxysilane and of zinc dithiophosphate preferably represents less than 10%, more preferably less than 8%, relative to the weight of reinforcing white filler. In particular the quantity is between 4% and 8% relative to the weight of reinforcing white filler.

B) Guanidine Derivative

The second component necessary for activation of the coupling is a guanidine derivative, i.e., a substituted guanidine. Substituted guanidines are well-known to those skilled in the art, in particular as vulcanization agents, and have been described in numerous documents (see, for example, "Vulcanization and vulcanizing agents" by W. Hofmann, Ed. MacLaren and Sons Ltd (London), 1967, pp. 180–182; EP-A-0 683 203 or U.S. Pat. No. 5,569,721).

In the compositions according to the invention, preferably N,N'-diphenylguanidine (abbreviated to "DPG") is used, which corresponds to the specific formula (III-1) below:

(III-1)

However, guanidine derivatives other than DPG may also be used, in particular other aromatic guanidine derivatives corresponding to the general formula (III-2) below:

(III-2)

in which $Ar^1$ and $Ar^2$ each represent a substituted or non-substituted aryl group, preferably a phenyl group, and $R^8$ represents a hydrogen or a hydrocarbon group. Examples of compounds corresponding to formula (III-2) include triphenylguanidine or alternatively di-o-tolylguanidine, as well as the aforementioned DPG.

In the compositions according to the invention, the quantity of guanidine derivative is preferably between 0.5% and 4%, relative to the weight of reinforcing white filler, more preferably between 1% and 3%, or preferably between 0.25 and 4 phr, more preferably between 0.5 and 2 phr. Below the minimum amounts indicated, the effect of activation risks being inadequate, whereas beyond the maxima indicated generally no further improvement in the coupling is observed, whereas there is a risk of scorching.

Preferably, in the compositions of the invention, the amount of the coupling system comprising the polysulphurized alkoxysilane coupling agent and the coupling activator (zinc dithiophosphate+guanidine derivative) represents a total of between 2% and 20% relative to the weight of reinforcing white filler, more preferably between 5% and 15%. In the majority of cases, the coupling system of the invention has proved of sufficiently high performance, for the requirements of the rubber compositions which are intended for the manufacture of tires, in an amount less than 12%, or even less than 10%, relative to the weight of reinforcing white filler. Amounts of between 5% and 10% are, for example, advantageously possible in the compositions intended for treads for tires for passenger vehicles. Relative to the weight of diene elastomer present in the compositions of the invention, the amount of coupling system according to the invention is preferably between 1 and 10 phr, more preferably between 4 and 8 phr.

II-5. Various Additives

The rubber compositions according to the invention also contain all or part of the additives usually used in sulphur-cross-linkable diene rubber compositions intended for the manufacture of tires, such as, plasticizers, pigments, antioxidants, antiozonants, a cross-linking system based either on sulphur or on sulphur donors and/or peroxide and/or bismaleimides, vulcanization accelerators, vulcanization activators, extender oils, etc. A conventional non-reinforcing white filler, such as particles of clay, bentonite, talc, chalk, kaolin or titanium oxides, also may be associated with the reinforcing white filler.

The compositions according to the invention may also contain, in addition to the polysulphurized alkoxysilanes, covering agents (comprising, for example, the single Y function) for the reinforcing white filler or more generally processing aids liable, in known manner, owing to an improvement in the dispersion of the white filler in the rubber matrix and to a reduction in the viscosity of the compositions, to improve their ability to be worked in the uncured state. These agents include alkylalkoxysilanes (in particular alkyltriethoxysilanes), polyols, polyethers (for example polyethylene glycols), primary, secondary or tertiary amines, hydroxylated or hydrolysable polyorganosiloxanes, for example α,ω-dihydroxy-polyorganosiloxanes (in particular α,ω)-dihydroxy-polydimethylsiloxanes). These compositions may also contain coupling agents other than polysulphurized alkoxysilanes.

II-6. II-6. Preparation of the Rubber Compositions

The compositions are produced in appropriate mixers, using two successive preparation phases well-known to persons skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically less than 120° C., for example between 60° C. and 100° C., during which finishing phase the cross-linking or vulcanization system is incorporated. Such a two phase preparation has been described, for example, in the aforementioned EP-A-0 501 227.

According to a preferred embodiment of the invention, all the base constituents of the compositions according to the invention, namely the reinforcing white filler and the coupling system according to the invention which is formed by the association of the polysulphurized alkoxysilane, the zinc dithiophosphate and the guanidine derivative, are incorporated in the diene elastomer during the first, so-called non-productive, phase. In other words, these different base constituents are introduced into the mixer and are kneaded thermomechanically, in one or more stages, until a maximum temperature of between 130° C. and 200° C., preferably between 145° C. and 185° C., is reached.

By way of example, the first (non-productive) phase is carried in a single thermomechanical step during which all the constituents necessary, including the coupling system according to the invention, any additional covering agents or processing agents and various other additives, with the exception of the vulcanization system, are introduced into a suitable mixer, such as a conventional internal mixer. A second stage of thermomechanical working may be added, in this internal mixer, after the mixture has dropped and after intermediate cooling (preferably to a temperature of less than 100° C.), with the aim of making the compositions undergo complementary heat treatment, in order to improve further the dispersion of the reinforcing white filler and its coupling system in the elastomeric matraix.

After the mixture thus obtained has cooled, the vulcanization system is then incorporated at low temperature, generally in an external mixer such as an open mill. The entire composition is then mixed (productive phase) for several minutes, for example between 5 and 15 minutes.

The final composition thus obtained is then calendered for example in the form of a sheet, a plate or alternatively a rubber profiled element which can be used for the manufacture of semi-finished products such as treads.

The vulcanization (or curing) is carried out in known manner at a temperature generally between 130° C. and 200° C., for a sufficient time which may vary, for example, between 5 and 90 minutes, depending on the curing temperature, the vulcanization system adopted and the vulcanization kinetics of the composition in question.

It goes without saying that the invention relates to the rubber compositions previously described, both in the raw state (i.e. before curing) and in the cured state (i.e. after cross-linking or vulcanization).

Of course, the compositions according to the invention may be used alone or in a blend with any other rubber composition which can be used for manufacturing tires.

III. EXAMPLES OF EMBODIMENT OF THE INVENTION

III-1. Preparation of the Rubber Compositions

For the following tests, the procedure is as follows: the diene elastomer or the mixture of diene elastomers, the reinforcing filler, the coupling system according to the invention, then the various other ingredients, with the exception of the vulcanization system, are introduced into an internal mixer filled to 70% of capacity, the initial tank temperature of which is approximately 60° C. Thermomechanical working (non-productive phase) is then performed in one stage having a total duration of about 3 to 4 minutes, until a maximum "dropping" temperature of about 165° C. is obtained.

The mixture thus obtained is recovered, it is cooled and then sulphur and sulphenamide are added on an external mixer (homo-finisher) at 30° C., by mixing everything (productive phase) for an appropriate time, of between 5 and 12 minutes depending on the case.

The compositions thus obtained are then calendered either in the form of sheets (thickness of 2 to 3 mm) or of thin films of rubber in order to measure their physical or mechanical properties, or in the form of profiled elements which can be used directly, after cutting out and/or assembly to the dimensions desired, for example as semi-finished products for tires, in particular as treads.

In the following tests, the reinforcing white filler (highly dispersible silica) constitutes the entire reinforcing filler, but it goes without saying that a fraction of the latter, preferably a minority fraction, could be replaced by carbon black.

III-2. Tests

A) Test 1

Five rubber compositions (SBR elastomer) reinforced with silica which are intended for the manufacture of tires or treads for tires are compared. The SBR elastomer (styrene-butadiene copolymer) is prepared in solution, and contains 25% styrene, 58% 1,2-polybutadiene units and 22% trans-1,4-polybutadiene units.

These five compositions are identical, except for from the following differences:

Composition No. 1: no coupling agent;
Composition No. 2: TESPT (4 phr);
Composition No. 3: TESPT (2.8 phr);
Composition No. 4: TESPT (2.8 phr), with which there is associated DTPZn (1 phr, or 35.7% relative to the weight of silane);
Composition No. 5: no coupling agent, DTPZn alone (1 phr).

Each composition further comprises 1.5 phr of guanidine derivative (or 3% relative to the weight of reinforcing white filler). Only Composition No. 4 is in accordance with the invention. Composition No. 1 is the base composition devoid of coupling agent, whereas Composition No. 2 represents a reference composition of the prior art. Tables 1 and 2 show the formulation of the different compositions (Table 1 —amount of the various products expressed in phr), and their properties before and after curing (150° C., 40 minutes). FIG. 1 shows the curves of modulus (in MPa) as a function of the elongation (in %); these curves are marked C1 to C5, and correspond to Compositions Nos. 1 to 5 respectively.

It will be noted that, in Composition No. 2 in accordance with the prior art, the amount of TESPT represents 8% relative to the weight of reinforcing white filler, which is already a relatively low amount compared with the usual amounts for this type of coupling agent. The relatively low amount of 8% in Composition 2 is, however, greater by more than 40% than the amount of TESPT in Composition No. 4 according to the invention. In Composition No. 4, the amount of polysulphurized alkoxysilane represents less than 6% (precisely, 5.6%), and the total (TESPT+DTPZn) represents less than 8% (precisely, 7.6%) relative to the weight of reinforcing white filler; The coupling system itself (TESPT+DTPZn+DPG) represents less than 12% (precisely, 10.6%), relative to the weight of reinforcing white filler.

The results indicate that Composition No. 4 according to the invention, compared with reference Composition No. 2, has equivalent or even better performance, despite a significantly lower amount of TESPT:

low Mooney viscosity (95 MU in both cases), which indicates good abilities for working in the uncured state, for each of the two compositions;

higher $T_{BR}$, which indicates a high level of reinforcement of the elastomer by the reinforcing white filler;

low hysteresis losses (HL) in both cases, with a slightly better result for Composition No. 4 according to the invention;

equivalent properties at break.

Moreover, a comparison between Composition No. 2 and Compositions No. 3 (amount of TESPT reduced to 2.8 phr, but without DTPZn) and No. 5 (DTPZn and DPG alone without coupling agent) demonstrates the synergistic effect obtained between the polysulphurized alkoxysilane, the zinc dithiophosphate and the guanidine derivative. TESPT, in the presence of DPG, exhibits, for an amount of 2.8 phr, an insufficient performance (compare Composition No. 3 with Compositions No. 1 and No. 2), whereas DTPZn and the guanidine derivative, without coupling agent, have no linking effect between the elastomer and the reinforcing white filler (compare Compositions No. 5 and No. 1) and in no way modify the properties of the base Composition No. 1. Only the combination of the three products (TESPT+ DTPZn+DPG) makes it possible to obtain the desired technical effect.

FIG. 1 confirms the preceding observations. The values of modulus, for elongations of 100% and more, are at a maximum on Composition No. 4 (curve C4) according to the invention, greater than those observed on the reference Composition No. 2 (curve C2). Curves C1, C3 and C5 are located significantly below. For such a range of elongations, this behaviour illustrates a better interaction between the reinforcing filler and the elastomer, i.e. a maximum reinforcement effect, resulting from the coupling system of the invention.

B) Test 2

Three rubber compositions (mixture of SBR and BR elastomers) reinforced with silica, which are also intended for the manufacture of tires or treads for tires, are compared.

These three compositions are identical except for the following differences:

Composition No. 6: TESPT (6.4 phr);
Composition No. 7: TESPT (4.5 phr), with which there is associated DTPZn (0.75 phr, or 16.7% relative to the weight of TESPT);
Composition No. 8: TESPT (3.2 phr), with which there is associated DTPZn (0.75 phr, or 23.4% relative to the weight of TESPT).

Each composition further comprises 1.5 phr of guanidine derivative (or about 1.9% relative to the weight of reinforcing white filler). Composition No. 6 is the control for this test, and contains an amount of TESPT of 8% relative to the weight of reinforcing white filler (6.4 phr of TESPT per 80 phr of silica). Compositions No. 7 and No. 8, which are in accordance with the invention, contain an amount of TESPT which is significantly lower than that of Composition No. 6, in both cases less than 6% relative to the weight of reinforcing white filler (5.6% and 4% respectively).

Tables 3 and 4 show the formulation of the different compositions, and their properties before and after curing (150° C., 40 minutes).

For Compositions No. 7 and No. 8 according to the invention, the amount (TESPT+DTPZn) is 6.6% and 4.9% respectively relative to the weight of reinforcing white filler, which is advantageously less than the amount of 8% used for the TESPT alone in the composition of the prior art. The coupling system itself, formed by the association of the polysulphurized alkoxysilane, the zinc dithiophosphate and the guanidine derivative, advantageously represents less than 10% (precisely, 8.4%) for Composition No. 7, and less than 8% (precisely, 6.8%) for Composition No. 8, relative to the weight of reinforcing white filler.

Table 4 shows that Composition No. 7, compared to the control Composition No. 6, has improved processability (drop in the viscosity in the uncured state) and an improved level of reinforcement (higher $T_{BR}$, M100, M300, ratio M300/M100). The properties at break are equivalent, and the hysteresis properties of Composition No. 7 are slightly better.

A comparison of Composition No. 8 to control Composition No. 6 shows that the properties of Composition No. 8 measured after curing are strictly equivalent to those of the control composition, which comprises twice as much TESPT. While the viscosity in the uncured state is increased, this can easily be corrected by the person skilled in the art by adding, for example, a processing agent such as a plasticizer or an agent for covering the reinforcing white filler, during production of the composition.

C) Test 3

Two compositions based on natural rubber reinforced with silica are compared. The compositions can be used for the manufacture of tires or semi-finished products for tires, such as treads.

These two compositions are identical except for the following differences:

Composition No. 9: TESPT (6.4 phr);
Composition No. 10: TESPT (4.5 phr), with which there is associated DTPZn (0.75 phr, or 16.7% relative to the weight of TESPT);

Each composition further comprises 1.5 phr of guanidine derivative. Composition No. 10 is in accordance with the invention, whereas Composition No. 9 constitutes the control. Tables 5 and 6 show the formulation of the different compositions, and their properties before and after curing (150° C., 40 minutes).

As in the preceding tests, the amount of TESPT, expressed in % relative to the weight of reinforcing white filler, is greatly reduced in the Composition No. 10 according to the invention. Control Composition No. 9 contains 8% (6.4 phr of TESPT per 80 phr of silica) while Composition No. 10 contains 5.6% (4.5 phr of TESPT). It will be noted that the total quantity of polysulphurized alkoxysilane and DTPZn (4.5+0.75=5.25 phr) represents less than 8% (precisely, 6.6%) and the amount of coupling system itself (TESPT+DTPZn+DPG) less than 10% (precisely, 8.4%) relative to the weight of reinforcing white filler (80 phr), in the Composition No. 10 according to the invention.

Despite this very significant reduction in the quantity of TESPT, Composition No. 10 according to the invention has properties which are at least equal, if not superior, to those of the control composition (see Table 6): viscosity equivalent or even slightly lower in the uncured state; reinforcement properties at least equal or better (values M100 and M300 substantially identical, ratio M300/M100 greater, $T_{BR}$ higher); better hysteresis (HL slightly less); and equivalent properties at break.

D) Test 4

This test shows that the presence of a guanidine derivative is an essential component of the coupling system according to the invention.

Four compositions which are identical, except for the following differences, are compared:
- Composition No. 11: TESPT (6.4 phr) with guanidine derivative but without DTPZn;
- Composition No. 12: TESPT (4.5 phr) activated by 0.75 phr of DTPZn (or 16.7% relative to the weight of TESPT) and 0.75 phr of guanidine derivative (DPG);
- Composition No. 13: TESPT (4.5 phr) activated by 0.75 phr of DTPZn and 1.5 phr of guanidine derivative;
- Composition No. 14: TESPT (4.5 phr) with DTPZn (0.75 phr), but without guanidine derivative.

Composition No. 11 is the control for this test and contains 8% by weight of polysulphurized alkoxysilane relative to the weight of reinforcing white filler. The amount of coupling agent has been reduced, in Compositions No. 12 and No. 13 according to the invention, by 30% relative to the control composition.

Tables 7 and 8 show the formulation of the different compositions, and their properties before and after curing (150° C., 40 minutes). In the compositions according to the invention, the quantity of polysulphurized alkoxysilane represents less than 6% (precisely, 5.6%), and the quantity (TESPT+DTPZn) represents less than 8% (precisely, 6.6%), and the quantity of the coupling system itself (TESPT+DTPZn+DPG) represents less than 10% (precisely, 8.4% in Composition No. 13), or even less than 8% (precisely, 7.5% in Composition No. 12). These percentages are calculated relative to the weight of reinforcing white filler.

It can be seen that Compositions No. 12 and No. 13 according to the invention, to have, in the uncured state, a Mooney viscosity which is equivalent or greater but still satisfactory and a higher amount of "bound rubber" than control Composition No. 11. In the cured state, Compositions No. 12 and No. 13 have properties which are at least equal, or even better (see values of moduli M100 and M300, ratio M300/M100) and losses HL than the control. The results demonstrate a coupling (white filler/diene elastomer) of high quality in the compositions according to the invention, despite an amount of polysulphurized alkoxysilane which is very significantly lower.

With an identical amount of guanidine derivative (1.5 phr), Composition No. 13 according to the invention proves to be substantially better (see amount of "bound rubber", values M100, M300, M300/M100, losses HL) than the control Composition No. 11, which contains an amount of polysulphurized alkoxysilane which is greater by more than 40%.

Composition No. 14, which is devoid of guanidine derivative, has properties that are degraded compared with those of Compositions No. 12 and 13 of the invention, both in the uncured state and after curing (higher viscosity, lower $T_{BR}$, greater losses HL, lower level of reinforcement according to the values M100, M300 and ratio M300/M100), despite an identical amount (4.5 phr) of coupling agent TESPT and the presence of zinc dithiophosphate. This demonstrates that, the zinc dithiophosphate has no activation effect on the coupling agent in the absence of the guanidine derivative.

E) Test 5

This test shows that it is preferable, to incorporate the guanidine derivative into the elastomer with the reinforcing white filler and the rest of the coupling system (polysulphurized alkoxysilane and zinc dithiophosphate) during the first phase of thermomechanical working (non-productive phase), and not later with the vulcanization system (productive phase).

For this test, three rubber compositions according to the invention are prepared, each having identical formulations comprising 4.5 phr of TESPT, 1 phr of DTPZn (or approximately 22% relative to the weight of alkoxysilane) and 1.5 phr of guanidine derivative.

The only differences among the three compositions is in their production process. In Compositions No. 15 and No. 16, the guanidine derivative was incorporated into the elastomer with the reinforcing white filler and the rest of the coupling system in the internal mixer (non-productive phase), during the same stage of thermomechanical kneading, in according to the following scheme: at the same time as the filler, the alkoxysilane and the zinc dithiophosphate in the case of Composition No. 15; with a slight delay in time in the case of Composition No. 16 (alkoxysilane and zinc dithiophosphate at the same time as the filler, guanidine derivative one minute later). For Composition No. 17, the guanidine derivative was incorporated in the external mixer with the vulcanization system (sulphur and sulphenamide), during the productive phase, i.e. at the time such a vulcanization accelerator in conventionally added.

Tables 9 and 10 show the formulation of the different compositions, and their properties before and after curing (150° C., 40 minutes). In each of these compositions according to the invention, the quantity of polysulphurized alkoxysilane represents less than 6% (precisely, 5.6%), the quantity of (TESPT+DTPZn) less than 8% (precisely, 6.9%), and the coupling system itself (TESPT+DTPZn+DPG) less than 10% (precisely 8.8%), relative to the weight of reinforcing white filler.

The results show that the performances are good in all cases, in particular for such a low amount of TESPT, Compositions No. 15 and No. 16 have virtually identical properties, both in the uncured state and in the cured state.

Compositions No. 15 and No. 16 have substantially improved properties (a higher amount of "bound rubber", lower losses HL, values of moduli M100 and M300 and of ratio M300/M100 which are also higher) compared to Composition No. 17. These results indicate better coupling (white filler/diene elastomer) when the guanidine derivative is incorporated into the elastomer at the same time as the other components (polysulphurized alkoxysilane and zinc dithiophosphate) of the coupling system according to the invention, during the so-called "non-productive" phase of production.

F) Test 6

This test shows that the activation provided by the zinc dithiophosphate and the guanidine derivative, allows for the replacement to a tetrasulphurized alkoxysilane (TESPT) by a disulphurized alkoxysilane (TESPD), which is known to be less active than the former, without significantly harming the other properties of the rubber compositions.

Three compositions which are identical, except for the following differences, are compared:
Composition No. 18: TESPT (6.4 phr);
Composition No. 19: TESPD (5.6 phr);
Composition No. 20: TESPT (5.6 phr) activated by 0.75 phr of zinc dithiophosphate (or 13.4% relative to the weight of TESPD) and 1.5 phr of guanidine derivative.

Each composition comprises 1.5 phr of diphenylguanidine. Composition No. 18 is the control for this test (8% of TESPT relative to the weight of reinforcing white filler); Composition No. 19, which is also not in accordance with the invention, contains the TESPD in an isomolar amount relative to the amount of TESPT. Thus, in Compositions No. 18 and No. 19 the same amount of triethoxysilane functions reactive relative to the silica and to its hydroxyl surface groups is used. Composition No. 20 is in accordance with the invention. Relative to the weight of silica (80 phr), it comprises less than 8% (precisely, 7%) of polysulphurized alkoxysilane, less than 8% (precisely, 7.9%) of polysulphurized alkoxysilane and zinc dithiophosphate, and less than 10% (precisely, 9.8%) of coupling system according to the invention formed by the association of polysulphurized alkoxysilane, zinc dithiophosphate and guanidine derivative.

Tables 11 and 12 show the formulation of the different compositions and their properties before and after curing (150° C., 40 minutes). FIG. 2 shows the curves (C18 to C20) of modulus (in MPa) as a function of the elongation (in %), corresponding to Compositions No. 18 to No. 20, respectively.

Composition No. 19 has reinforcement properties after curing (M100, M300 and ratio M300/M100) which are substantially lower, as well as higher hysteresis losses compared to control Composition No. 18. Moreover, Composition No. 19 show a reduction in performances before curing (increase in viscosity, drop in the amount of "bound rubber"). These results are due to the lesser effectiveness of coupling (white filler/diene elastomer) of the disulphurized alkoxysilane (TESPD) in Composition No. 19 relative to the tetrasulphurized alkoxysilane (TESPT).

However, to the addition of a small quantity (0.75 phr) of zinc dithiophosphate to Composition No. 20 provides a very substantial increase in the reinforcement properties ($T_{BR}$, M100, M300, M300/M100) and a significant drop in the losses HL. The properties of Composition No. 20 are at a level equivalent to that observed on the control Composition No. 18. The effectiveness of the zinc dithiophosphate and the guanidine derivative combined, as coupling activator for the TESPD, is also clearly illustrated by the curves of FIG. 2 (curves C20 and C18 virtually overlapping, both located, in particular for elongations greater than 100%, well beyond curve C19).

G) Test 7

The invention is illustrated by running tests on radial-carcass tires of dimension 175/70 R14, which are manufactured in known manner and which are identical in all points except for the constitution of the rubber composition constituting the treads thereof which is given in Table 13.

The reinforcing white filler is a highly dispersible silica. Relative to the weight of this white filler, coupling (white filler/diene elastomer) is ensured by 8% TESPT in control Composition No. 21 and by less than 6% (precisely, 5.5%) only of TESPT in Composition No. 22 according to the invention. The latter contains a reduction of about 30% in the quantity of polysulphurized alkoxysilane coupling agent.

In the tread of the tire according to the invention, the 5.5% TESPT is activated by a very small quantity of zinc dithiophosphate (0.75 phr, or 17% relative to the weight of alkoxysilane) in combination with 1.5 phr of guanidine derivative. The quantity of alkoxysilane and of zinc dithiophosphate represents less than 8% (precisely, 6.4%) relative to the weight of reinforcing white filler and the amount of coupling system according to the invention (TESPT+DTPZn+DPG) represents less than 10% (precisely, 8.3%) relative to the weight of reinforcing white filler.

The tires thus prepared are subjected to on-road travel on a Citroën Xantia passenger car, until the wear due to running reaches the wear indicators located in the grooves of the tread. In a manner known to the person skilled in the art, the wear resistance of the rubber composition, during travel of the tire, is directly correlated to the quality of the reinforcement supplied by the reinforcing filler, i.e., to the amount of coupling (filler/elastomer) obtained. In other words, measurement of the wear resistance is an excellent, if not the best, indicator of the performance of the coupling system used since it is evaluated on the final manufactured product.

After travel, the tire, the tread of which is in accordance with the invention, exhibits a performance which is at least equal to or even slightly better than that of the control tire (gain of about 1% in wear resistance noted on the tire of the invention), without adversely affecting the other running performances. This equivalent wear resistance, despite a greatly reduced amount of coupling agent, was only able to be obtained owing to the strong activation of the coupling provided by the zinc dithiophosphate and the guanidine derivative in combination.

In conclusion, as shown by the various tests above, the novel coupling system (white filler/diene elastomer) according to the invention, which is formed by the association of a polysulphurized alkoxysilane, a zinc dithiophosphate and a guanidine derivative, offers a particularly advantageous compromise of properties to the compositions of the invention, relative to compositions reinforced with a white filler of the prior art.

In this novel coupling system, the zinc dithiophosphate and the guanidine derivative used in combination as coupling activator make it possible to substantially reduce the amounts of polysulphurized alkoxysilanes conventionally used in the rubber compositions for tires reinforced with a white filler. The invention thus makes it possible to reduce the cost of the rubber compositions, and therefore that of the tires manufactured from such compositions.

The invention also makes it possible, if an identical amount of polysulphurized alkoxysilane is maintained, to obtain an even better level of coupling, and therefore to obtain a further improved reinforcement of the rubber compositions by the reinforcing white filler.

TABLE 1

| Composition No.: | 1 | 2 | 3 | 4 | 5 |
|---|---|---|---|---|---|
| SBR (1) | 100 | 100 | 100 | 100 | 100 |
| silica (2) | 50 | 50 | 50 | 50 | 50 |
| TESPT (Si69) | — | 4 | 2.8 | 2.8 | — |
| DTPZn (3) | — | — | — | 1 | 1 |
| ZnO | 2.5 | 2.5 | 2.5 | 2.5 | 2.5 |
| stearic acid | 2 | 2 | 2 | 2 | 2 |
| antioxidant (4) | 1.9 | 1.9 | 1.9 | 1.9 | 1.9 |
| DPG (5) | 1.5 | 1.5 | 1.5 | 1.5 | 1.5 |

TABLE 1-continued

| Composition No.: | 1 | 2 | 3 | 4 | 5 |
|---|---|---|---|---|---|
| sulphur | 1.1 | 1.1 | 1.1 | 1.1 | 1.1 |
| CBS (6) | 2 | 2 | 2 | 2 | 2 |

(1) SBR with 25% styrene, 58% of 1,2-polybutadiene units and 22% of trans-1-4 polybutadiene units (Tg = −29° C.);
(2) silica Zeosil 1165 MP manufactured by Rhodia;
(3) Rhenocure TP/G manufactured by Rhein-Chemie (50% by weight of DTPZn on elastomeric support - or, here, 2 phr of Rhenocure TP/G);
(4) N-1,3-dimethylbutyl-N-phenyl-para-phenylenediamine;
(5) diphenylguanidine;
(6) N-cyclohexyl-2-benzothiazyl sulphenamide.

TABLE 2

| Composition No. | 1 | 2 | 3 | 4 | 5 |
|---|---|---|---|---|---|
| Properties before curing: | | | | | |
| Mooney (MU) | 120 | 95 | 105 | 95 | 120 |
| $T_{BR}$ (%) | 23 | 35 | 30 | 40 | 25 |
| Properties after curing: | | | | | |
| HL (%) | 40 | 26 | 33 | 24 | 39 |
| Breaking stress (MPa) | 20 | 17 | 18 | 18 | 20 |
| Elongation at break (%) | 650 | 320 | 400 | 320 | 670 |

TABLE 3

| Composition No.: | 6 | 7 | 8 |
|---|---|---|---|
| SBR (1) | 75 | 75 | 75 |
| BR (1 bis) | 25 | 25 | 25 |
| silica (2) | 80 | 80 | 80 |
| aromatic oil | 39.5 | 39.5 | 39.5 |
| TESPT (Si69) | 6.4 | 4.5 | 3.2 |
| DTPZn (3) | — | 0.75 | 0.75 |
| ZnO | 2.5 | 2.5 | 2.5 |
| stearic acid | 2 | 2 | 2 |
| antioxidant (4) | 1.9 | 1.9 | 1.9 |
| DPG (5) | 1.5 | 1.5 | 1.5 |
| sulphur | 1.1 | 1.1 | 1.1 |
| CBS (6) | 2 | 2 | 2 |

(1) to (6) idem Table 1;
(1 bis) BR with 4.3% of 1–2; 2.7% of trans; 93% of cis 1–4 (Tg: −106° C.);

TABLE 4

| Composition No. | 6 | 7 | 8 |
|---|---|---|---|
| Properties before curing: | | | |
| Mooney (MU) | 114 | 108 | 130 |
| $T_{BR}$ (%) | 52 | 54 | 54 |
| Properties after curing: | | | |
| M10 (MPa) | 5.3 | 5.7 | 5.3 |
| M100 (MPa) | 2.0 | 2.3 | 2.0 |
| M300 (MPa) | 3.2 | 3.9 | 3.2 |
| M300/M100 | 1.6 | 1.7 | 1.6 |
| HL(%) | 28 | 25 | 28 |
| Breaking stress (MPa) | 23 | 23 | 23 |
| Elongation at break (%) | 570 | 490 | 570 |

TABLE 5

| Composition No.: | 9 | 10 |
|---|---|---|
| natural rubber | 100 | 100 |
| silica (2) | 80 | 80 |
| aromatic oil | 35 | 35 |
| TESPT (Si69) | 6.4 | 4.5 |
| DTPZn (3) | — | 0.75 |
| ZnO | 2.5 | 2.5 |
| stearic acid | 2 | 2 |
| antioxidant (4) | 1.9 | 1.9 |
| DPG (5) | 1.5 | 1.5 |
| sulphur | 1.1 | 1.1 |
| CBS (6) | 2 | 2 |

(2) to (6) idem Table 1;

TABLE 6

| Composition No.: | 9 | 10 |
|---|---|---|
| Properties before curing: | | |
| Mooney (MU) | 50 | 48 |
| $T_{BR}$ (%) | 37 | 48 |
| Properties after curing: | | |
| M10 (MPa) | 6.4 | 6.0 |
| M100 (MPa) | 2.1 | 1.9 |
| M300 (MPa) | 2.0 | 2.0 |
| M300/M100 | 0.95 | 1.05 |
| HL (%) | 26 | 24 |
| Breaking stress (MPa) | 20 | 20 |
| Elongation at break (%) | 530 | 550 |

TABLE 7

| Composition No.: | 11 | 12 | 13 | 14 |
|---|---|---|---|---|
| SBR (1) | 57.5 | 57.5 | 57.5 | 57.5 |
| BR (1 bis) | 42.5 | 42.5 | 42.5 | 42.5 |
| silica (2) | 80 | 80 | 80 | 80 |
| aromatic oil | 39.5 | 39.5 | 39.5 | 39.5 |
| TESPT (Si69) | 6.4 | 4.5 | 4.5 | 4.5 |
| DTPZn (3) | — | 0.75 | 0.75 | 0.75 |
| ZnO | 2.5 | 2.5 | 2.5 | 2.5 |
| stearic acid | 2 | 2 | 2 | 2 |
| antioxidant (4) | 1.9 | 1.9 | 1.9 | 1.9 |
| DPG (5) | 1.5 | 0.75 | 1.5 | — |
| sulphur | 1.1 | 1.1 | 1.1 | 1.1 |
| CBS (6) | 2.0 | 2.0 | 2.0 | 2.0 |

(1) to (6); (1 bis) idem Table 3;

TABLE 8

| Composition No.: | 11 | 12 | 13 | 14 |
|---|---|---|---|---|
| Properties before curing: | | | | |
| Mooney (MU) | 84 | 100 | 82 | 110 |
| $T_{BR}$ (%) | 43 | 47 | 50 | 43 |
| Properties after curing: | | | | |
| M10 (MPa) | 5.4 | 5.6 | 5.8 | 5.1 |
| M100 (MPa) | 1.7 | 1.8 | 1.95 | 1.6 |
| M300 (MPa) | 2.1 | 2.2 | 2.5 | 1.9 |
| M300/M100 | 1.24 | 1.22 | 1.28 | 1.19 |
| HL (%) | 27 | 26 | 26 | 29 |
| Breaking stress (MPa) | 20 | 20 | 20 | 20 |
| Elongation at break (%) | 560 | 510 | 490 | 620 |

TABLE 9

| Composition No.: | 15 | 16 | 17 |
|---|---|---|---|
| SBR (1) | 70 | 70 | 70 |
| BR (1 bis) | 30 | 30 | 30 |
| silica (2) | 80 | 80 | 80 |
| aromatic oil | 39.5 | 39.5 | 39.5 |
| TESPT (Si69) | 4.5 | 4.5 | 4.5 |
| DTPZn (3) | 1 | 1 | 1 |
| ZnO | 2.5 | 2.5 | 2.5 |
| stearic acid | 2 | 2 | 2 |
| antioxidant (4) | 1.9 | 1.9 | 1.9 |
| DPG (5) | 1.5 | 1.5 | 1.5 |
| sulphur | 0.7 | 0.7 | 0.7 |
| CBS (6) | 1 | 1 | 1 |

TABLE 10

| Composition No.: | 15 | 16 | 17 |
|---|---|---|---|
| Properties before curing: | | | |
| Mooney (MU) | 100 | 101 | 104 |
| $T_{BR}$ (%) | 51 | 50 | 44 |
| Properties after curing: | | | |
| M10 (MPa) | 5.8 | 5.9 | 6.3 |
| M100 (MPa) | 2.1 | 2.1 | 1.9 |
| M300 (MPa) | 3.0 | 2.9 | 2.2 |
| M300/M100 | 1.40 | 1.35 | 1.20 |
| HL (%) | 26 | 26 | 30 |
| Breaking stress (MPa) | 19 | 19 | 19 |
| Elongation at break (%) | 410 | 415 | 520 |

TABLE 11

| Composition No.: | 18 | 19 | 20 |
|---|---|---|---|
| SBR (1) | 57.5 | 57.5 | 57.5 |
| BR (1 bis) | 42.5 | 42.5 | 42.5 |
| silica (2) | 80 | 80 | 80 |
| aromatic oil | 39.5 | 39.5 | 39.5 |
| TESPT (Si69) | 6.4 | — | — |
| TESPD (Si266) | — | 5.6 | 5.6 |
| DTPZn (3) | — | — | 0.75 |
| ZnO | 2.5 | 2.5 | 2.5 |
| stearic acid | 2 | 2 | 2 |
| antioxidant (4) | 1.9 | 1.9 | 1.9 |
| DPG (5) | 1.5 | 1.5 | 1.5 |
| sulphur | 1.1 | 1.1 | 1.1 |
| CBS (6) | 2 | 2 | 2.0 |

TABLE 12

| Composition No.: | 18 | 19 | 20 |
|---|---|---|---|
| Properties before curing: | | | |
| Mooney (MU) | 89 | 96 | 90 |
| TBR (%) | 43 | 40 | 42 |
| Properties after curing: | | | |
| M10 (MPa) | 5.7 | 5.3 | 5.8 |
| M100 (MPa) | 1.7 | 1.3 | 1.7 |
| M300 (MPa) | 1.9 | 1.2 | 1.95 |
| M300/M100 | 1.10 | 0.90 | 1.15 |
| HL (%) | 29 | 35 | 30 |
| Breaking stress (MPa) | 19 | 19 | 19.5 |
| Elongation at break (%) | 600 | 800 | 600 |

TABLE 13

| Composition No.: | 21 | 22 |
|---|---|---|
| SBR (1) | 70 | 70 |
| BR (1 bis) | 30 | 30 |
| silica (2) | 80 | 80 |
| aromatic oil | 35 | 35 |
| TESPT (Si69) | 6.4 | 4.4 |
| DTPZn (3) | — | 0.75 |
| ZnO | 2.5 | 2.5 |
| stearic acid | 2 | 2 |
| paraffin oil (7) | 1.5 | 1.5 |
| antioxidant (4) | 1.9 | 1.9 |
| DPG (5) | 1.5 | 1.5 |
| sulphur | 1.1 | 1.1 |
| CBS (6) | 2 | 2 |

(1) to (6) idem Table 1;
(7) mixture of macro- and microcrystalline antiozone waxes.

What is claimed is:

1. A rubber composition usable for the manufacture of tires, comprising, as base constituents, a diene elastomer, a reinforcing white filler, and a coupling system, said coupling system comprising a polysulphurized alkoxysilane coupling agent, a zinc dithiophosphate and a guanidine derivative.

2. The rubber composition according to claim 1, in which the guanidine derivative is diphenylguanidine.

3. The rubber composition according to claim 1, in which the polysulphurized alkoxysilane is a bis-alkoxy($C_1$–$C_4$) silylpropyl polysulphide.

4. The rubber composition according to claim 3, in which the polysulphurized alkoxysilane is bis-3-triethoxysilylpropyl tetrasulphide.

5. The rubber composition according to claim 3, in which the polysulphurized alkoxysilane is bis-3-triethoxysilylpropyl disulphide.

6. The rubber composition according to claim 1, in which the quantity of polysulphurized alkoxysilane represents less than 8% relative to the weight of reinforcing white filler.

7. The rubber composition according to claim 6, in which the quantity of polysulphurized alkoxysilane represents less than 6% relative to the weight of reinforcing white filler.

8. The rubber composition according to claim 1, in which the zinc dithiophosphate is a zinc ($C_1$–$C_{12}$) alkyl dithiophosphate.

9. The rubber composition according to claim 1, in which the quantity of zinc dithiophosphate represents between 5% and 60% relative to the weight of polysulphurized alkoxysilane.

10. The rubber composition according to claim 9, in which the quantity of zinc dithiophosphate represents between 10% and 40% relative to the weight of polysulphurized alkoxysilane.

11. The rubber composition according to claim 1, in which the total quantity of the polysulphurized alkoxysilane and the zinc dithiophosphate represents less than 10% relative to the weight of reinforcing white filler.

12. The rubber composition according to claim 11, in which the total quantity of the polysulphurized alkoxysilane and the zinc dithiophosphate represents between 4% and 8% relative to the weight of reinforcing white filler.

13. The rubber composition according to claim 1, in which the quantity of guanidine derivative represents between 0.5 and 4% relative to the weight of reinforcing white filler.

14. The rubber composition according to claim 1, in which the total quantity of the coupling system comprising the polysulphurized alkoxysilane, the zinc dithiophosphate and the guanidine derivative represents between 2% and 20% relative to the weight of reinforcing white filler.

15. The rubber composition according to claim 14, in which the total quantity of the coupling system comprising the polysulphurized alkoxysilane, the zinc dithiophosphate and the guanidine derivative represents between 5% and 15% relative to the weight of reinforcing white filler.

16. The rubber composition according to claim 15, in which the total quantity of the coupling system comprising the polysulphurized alkoxysilane, the zinc dithiophosphate and the guanidine derivative represents between 5% and 12% relative to the weight of reinforcing white filler.

17. The rubber composition according to claim 16, in which the total quantity of the coupling system comprising the polysulphurized alkoxysilane, the zinc dithiophosphate and the guanidine derivative represents between 5% and 10% relative to the weight of reinforcing white filler.

18. The rubber composition according to claim 1, in which the reinforcing white filler comprises a majority of silica.

19. The rubber composition according to claim 1, in which the reinforcing white filler constitutes the entire reinforcing filler.

20. The rubber composition according to claim 1 or 18, further comprising carbon black as filler.

21. The rubber composition according to claim 1, in which the diene elastomer is selected from the group consisting of polybutadienes, polyisoprenes, natural rubber, butadiene-styrene copolymers, butadiene-isoprene copolymers, isoprene-styrene copolymers, butadiene-styrene-isoprene copolymers, and mixtures thereof.

22. The rubber composition according to claim 21, in which the diene elastomer is a butadiene-styrene copolymer.

23. The rubber composition according to claim 21, in which the diene elastomer is a mixture of a butadiene-styrene copolymer and a polybutadiene.

24. The rubber composition according to claim 22 or 23, in which the butadiene-styrene copolymer is prepared in solution and has a styrene content of between 20% and 30% by weight, a content of vinyl bonds of the butadiene part of between 15% and 65% by weight, a content of trans-1,4 bonds of between 20% and 75% by weight, and a glass transition temperature of between −20° C. and −55° C.

25. The rubber composition according to claim 23, in which the polybutadiene has more than 90% cis-1,4 bonds.

26. A process for preparing a rubber composition usable in the manufacture of a tire comprising incorporating by kneading into a diene elastomer, a reinforcing white filler and a coupling system, said coupling system comprising a polysulphurized alkoxysilane coupling agent, a zinc dithiophosphate and a guanidine derivative.

27. The process according to claim 26, wherein the composition is thermomechanically kneaded until a maximum temperature of between 130° C. and 200° C. is reached.

28. The process according to claim 26, in which the composition is thermomechanically kneaded until a maximum temperature of between 145° C. and 180° C. is reached.

29. A rubber composition prepared by the method of any one of claims 26 to 28.

30. A tire or a semi-finished rubber product intended for tires, selected from the group consisting of treads, underlayers for such treads, crown plies, sidewalls, carcass plies, beads, protectors, inner tubes and airtight internal rubbers for tubeless tires comprising a rubber composition, said rubber composition comprising as base constituents, a diene elastomer, a reinforcing white filler and a coupling system, said coupling system comprising a polysulphurized alkoxysilane coupling agent, a zinc dithiophosphate and a guanidine derivative.

31. A semi-finished product according to claim 30, consisting of a tread.

32. The tread according to claim 31, characterized in that it is based on a rubber composition according to claim 21.

33. A coupling system for a rubber composition based on a diene elastomer reinforced by a white filler, usable for the manufacture of tires, the coupling system comprising a polysulphurized alkoxysilane coupling agent, a zinc dithiophosphate and a guanidine derivative.

34. The coupling system according to claim 33, in which the polysulphurized alkoxysilane represents more than 50% by weight of the coupling system.

35. The coupling system according to claim 33, in which the guanidine derivative is diphenylguanidine.

36. The coupling system according to claim 33, in which the polysulphurized alkoxysilane is a bis-($C_1$–$C_4$) alkoxyl silylpropyl polysulphide.

37. The coupling system according to claim 36, in which the polysulphurized alkoxysilane is bis-3-triethoxysilylpropyl tetrasulphide.

38. The coupling system according to claim 36, in which the polysulphurized alkoxysilane is bis-3-triethoxysilylpropyl disulphide.

39. The coupling system accoring to claim 33, in which the zinc dithiophosphate is a zinc ($C_1$–$C_{12}$) alkyl dithiophosphate.

40. A method of coupling a reinforcing white filler and a diene elastomer in a rubber composition usable for the manufacture of tires comprising adding to said diene elastomer and reinforcing white filler a coupling system comprising a polysulfurized alkoxysilane coupling agent, a zinc dithiophosphate and a guanidine derivative.

41. The method according to claim 40, in which the zinc dithiophosphate and guanidine derivative activate the coupling function of the polysulphurized alkoxysilane.

42. The method according to claim 41, in which the polysulphurized alkoxysilane is a bis-($C_1$–$C_4$)alkoxy silylpropyl polysulphide.

43. The method according to claim 42, in which the polysulphurized alkoxysilane is bis-3-triethoxysilylpropyl tetrasulphide.

44. The method according to claim 42, in which the polysulphurized alkoxysilane is bis-3-triethoxysilylpropyl disulphide.

45. The method according to claim 40, in which the zinc dithiophosphate is a zinc ($C_1$–$C_{12}$) alkyl dithiophosphate.

46. The method according to claim 40, in which guanidine derivative is diphenylguanidine.

* * * * *